Figure 1:
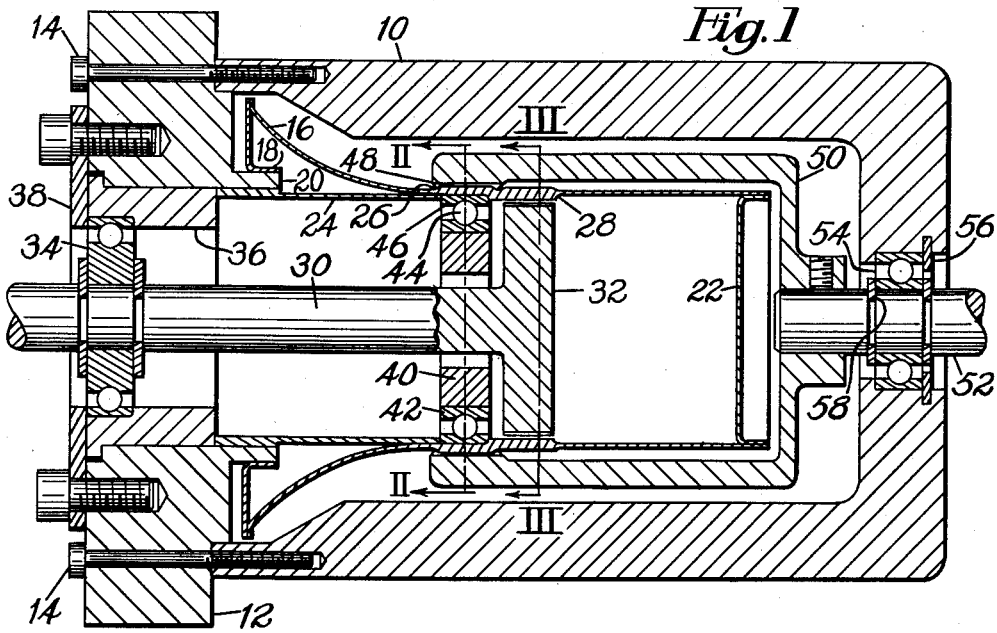

July 27, 1965   H. A. ROBINSON   3,196,713
HERMETICALLY SEALED TRANSMISSIONS
Filed Jan. 9, 1964   5 Sheets-Sheet 1

Inventor
Hugh A. Robinson
By his Attorney
Carl E. Johnson.

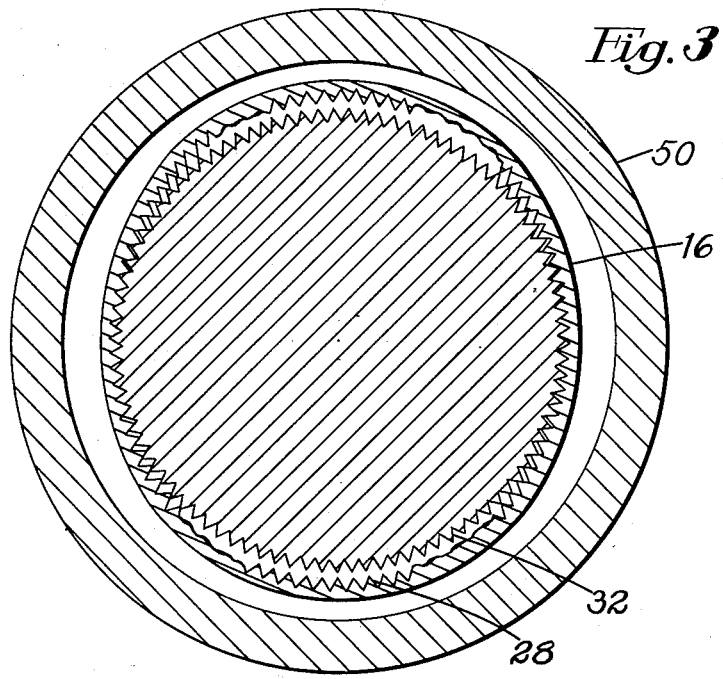

July 27, 1965 H. A. ROBINSON 3,196,713
HERMETICALLY SEALED TRANSMISSIONS
Filed Jan. 9, 1964
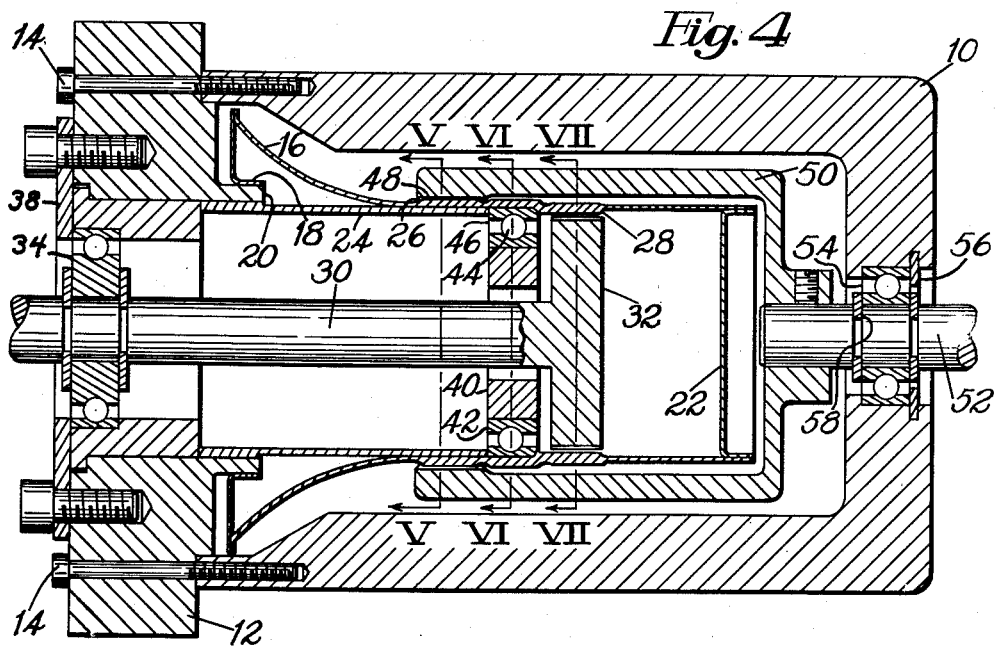
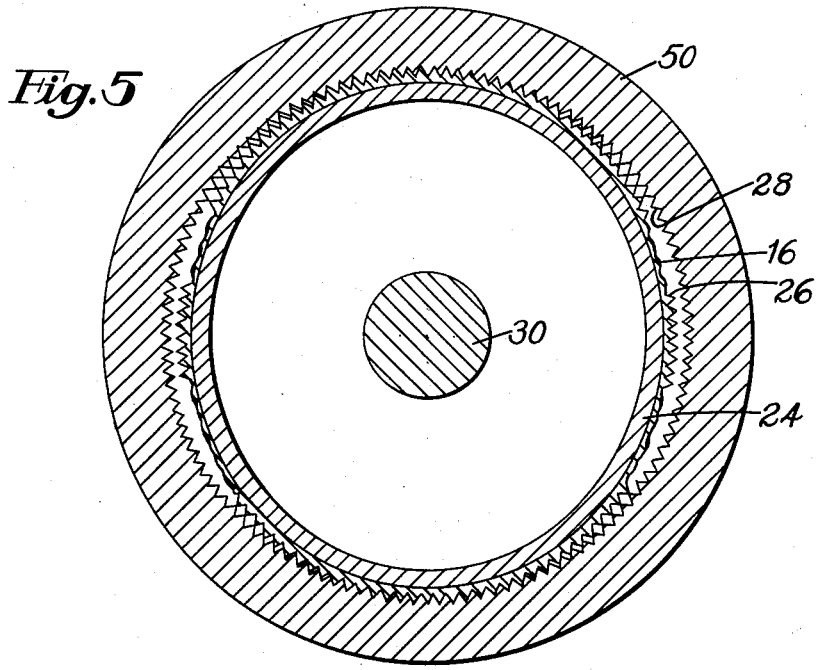

July 27, 1965  H. A. ROBINSON  3,196,713
HERMETICALLY SEALED TRANSMISSIONS
Filed Jan. 9, 1964  5 Sheets-Sheet 4

July 27, 1965 H. A. ROBINSON 3,196,713
HERMETICALLY SEALED TRANSMISSIONS
Filed Jan. 9, 1964 5 Sheets-Sheet 5

United States Patent Office 3,196,713
Patented July 27, 1965

3,196,713
HERMETICALLY SEALED TRANSMISSIONS
Hugh A. Robinson, Wenham, Mass., assignor to United Shoe Machinery Corporation, Boston, Mass., a corporation of New Jersey
Filed Jan. 9, 1964, Ser. No. 336,786
9 Claims. (Cl. 74—640)

This invention relates to mechanism for transmitting a torque through a hermetically sealed barrier. More especially the invention is concerned with providing an improved rotary-to-rotary transmission of the controlled radial deflection type (commonly known as "harmonic drive") wherein the output speed is in 1:1 ratio to the input, and even greater torque capability is attained for a given size and weight. The invention is herein shown and described as embodied in mechanically different arrangements for purposes of illustration, it being understood that the invention is not necessarily thus limited in design or application.

Heretofore transmission of torque in 1:1 ratio has been effected through a sealed wall or other hermetic barrier with the aid of a radially deflectable tubular member as disclosed, for instance, in United States Letters Patent No. 2,943,495, issued July 5, 1960 in the name of C. Walton Musser. Also, transmission through a sealed wall has previously been accomplished by use of a harmonic drive assembly or of such units in tandem (for instance as taught in United States Letters Patent No. 2,943,513), each unit including the usual three coaxial elements, namely: a rotary wave generator, a flexspline mounted for cooperation with the wave generator, and a rigid circular spline having circumferentially spaced localities of engagement with the flexspline. Such rotary-to-rotary drives are usually simpler and more reliable than prior art mechanisms in imparting motion through seals or diaphragms, or by magnetic force or electrical induction. In prior 1:1 arrangements of the harmonic drive type wave generators, which have relatively low torque capability, were utilized at input and output. In contrast thereto, in the present invention the input and output torque are derived from harmonic drive rigid spline engagements which, advantageously, have higher torque capacity.

It accordingly is a primary object of this invention to provide a harmonic drive type hermetically sealed transmission of 1:1 ratio and improved construction which shall have higher torque carrying capacity for a given overall size. A non-rotating barrier in the form of a pressure-tight tubular flexspline is employed to transmit from a lobar wave generator rotational motion in the form of a wave of radial deflection. In accordance with a feature of the invention and as herein shown the flexspline is now advantageously formed with both internal and external splines respectively engageable with circular splines one of which serves as an input and the other as an output. Input rotation of the one circular spline causes increased rotational speed of the "free wheeling" wave generator, usually though not necessarily elliptoidal in shape, and it then transmits a much reduced speed at high torque between the flexspline and the circular spline on the output side of the barrier. Since environmental problems, for example excessive corrosiveness, poor lubrication, or unusual temperatures are often limiting on one side of the barirer, it is of course desirable that the wave generator be located on that side of the barrier affording the better environment for the wave generator bearings. When input and output circular splines have the same number of teeth, a 1:1 coupling is effected, the direction of rotation being reversed.

Figure 2:
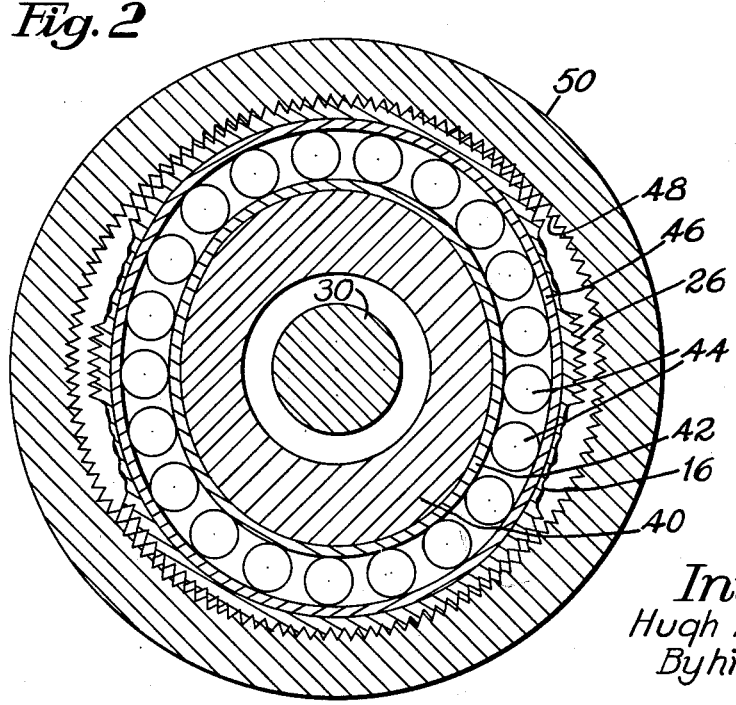
Figure 6:
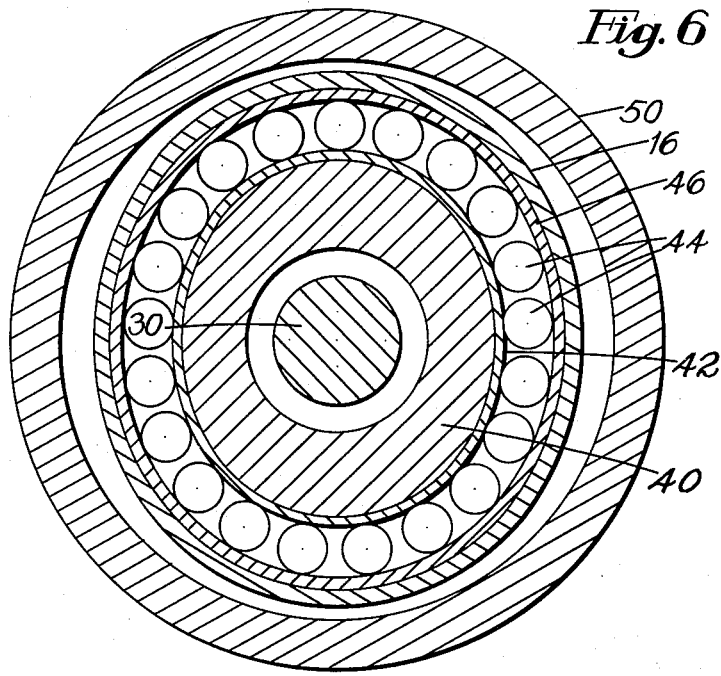
Figure 7:
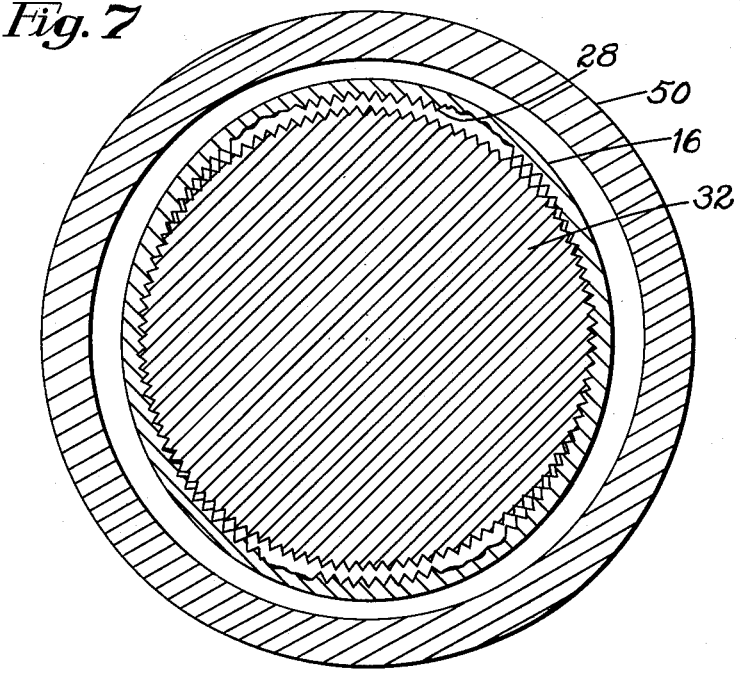
Figure 8:
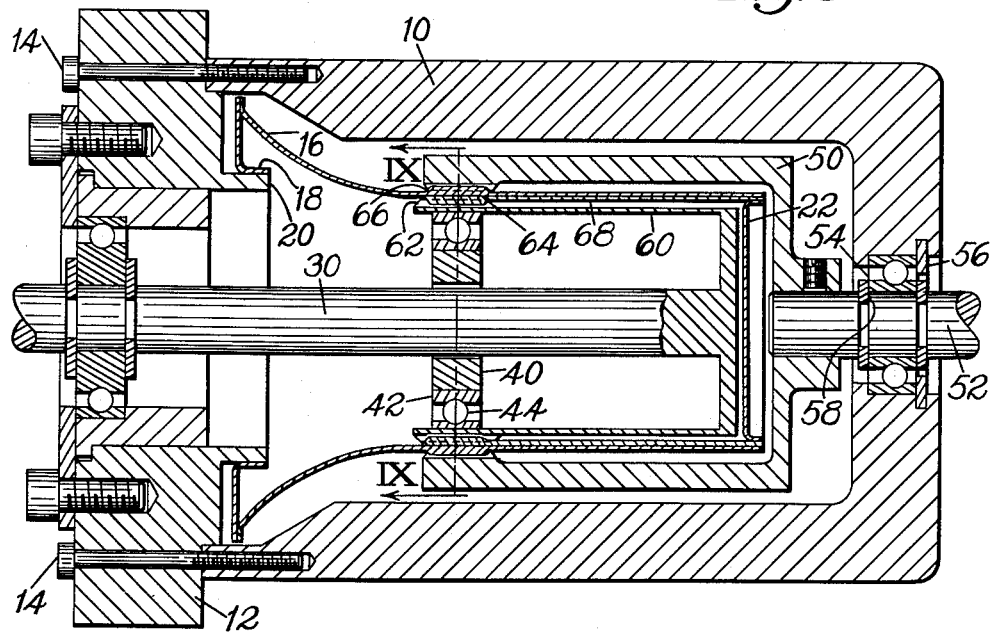
Figure 9:
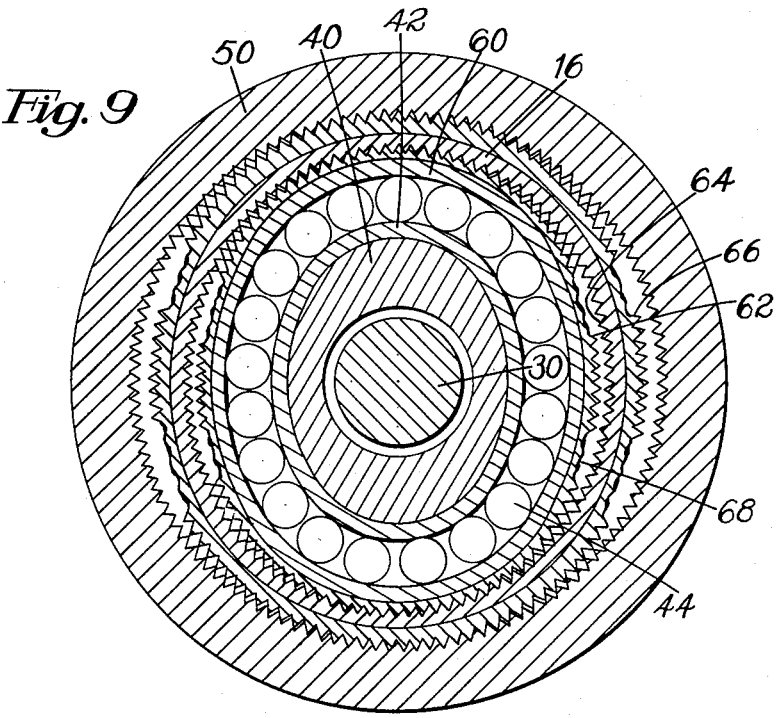

The foregoing and other features of the invention will now be described with more particularity in connection with illustrative embodiments thereof and with reference to the accompanying drawings, in which:

FIG. 1 is an axial section of a 1:1 hermetic transmission of harmonic drive type;
FIG. 2 is a transverse section taken on the line II—II of FIG. 1;
FIG. 3 is a transverse section taken on the line III—III of FIG. 1 and showing spline engagements 90° out of phase with those of FIG. 2;
FIG. 4 is an axial section showing a drive similar to that of FIG. 1, but differing in that a wave generator is axially disposed between the localities of spline engagements;
FIGS. 5, 6 and 7 are sections taken, respectively, on the lines V—V, VI—VI and VII—VII of FIG. 4;
FIG. 8 is an axial section showing a drive similar to that of FIGS. 1 and 4, but differing in that a pair of flexsplines is advantageously employed; and
FIG. 9 is a transverse section taken on the line IX—IX of FIG. 8.

In each of the three illustrative arrangements a flexspline of flaring shape is shown, but it will be understood that a flexspline of different type may be employed, for example, one cup-shaped. It will also be clear that although one shaft is designated an input member and another an output member, in each of the illustrative cases the arrangement is reversible so that an output member may at times serve as an input member, and vice-versa. Moreover, while the wave generator is herein shown as elliptoidal, the wave generator of the invention may have more than two lobes.

Referring to FIG. 1 a stationary housing 10 has a coaxial annular extension 12 secured thereon by bolts 14. A hermetically sealed barrier in the form of a tubular flexspline 16 is welded at one end portion 18 to an inwardly extending annular flange 20 formed on the extension 12, an opposite end of the flexspline being closed by a sealing cap 22. In order to improve durability and for a functional purpose subsequently explained, the flexspline preferably has an internal cylindrical sleeve 24 which is attached at one end as by welding to the flange 20 and coaxially extends to an intermediate portion of the flexspline whereat external spline teeth 26 (FIGS. 1 and 2) are formed to transmit output torque. This flexspline 16 is non-rotating but constitutes one of the operating elements of the transmission by reason of its ability to be radially deflected and to have its resultant shape rotated. Axially offset from the set of external spline teeth 26 is a set of internal teeth 28 formed on the flexspline.

Input means consists of an axially extending shaft 30 the inboard end of which is formed as a rigid circular spline 32 arranged to engage and fully mesh with the teeth 28 of the deflected flexspline in spaced circumferential localities as shown in FIG. 3. In accordance with the general principles of harmonic drive, as set forth, for instance, in United States Letters Patent No. 2,906,143, issued September 29, 1959 in the name of C. Walton Musser, the teeth 32 are less in number than the relatively outer teeth 28 by the number, or by an integral multiple of the number, of lobes to be imposed on the flexspline as hereinafter described, and have the same tooth form. The shaft 30 is rotatably journaled in a bearing 34 the outer race of which is nested in a ring 36 that is itself clamped against a shoulder of the extension 12 by a retaining plate 38.

Concentric with the shaft 30, and axially alined with the external flexspline teeth 26, is an annular wave generator 40 (FIGS. 1 and 2), in this case of elliptoidal shape, its major axis being shown vertical in FIG. 2. This wave generator has its usual purpose of imposing its lobar shape on the flexspline 16 and this is effected preferably through a bearing consisting of an inner race 42, roller elements such as balls 44 and an external race 46 which in this instance is formed integrally with, and constitutes an end portion of, the sleeve 24. The latter axially abuts the ring 36 and thus maintains the race 46 in its operating position. It will be noted in FIGS. 1 and 2 that the wave generator 40 has outwardly deflected the teeth 26 of the flexspline at its major axis into engagement and fully meshing relation with internal spline teeth 48 formed on an output circular spline 50, these teeth clearing and non-meshing at the minor axis. It will also be observed that, as shown in FIG. 3, the consequence of such radial deflection of the flexspline is to effect major axis engagements and meshing of the teeth 28 and the circular spline 32, but at diametrically opposed localities 90° out of phase with those of the meshing teeth 26, 48.

The output circular spline 50 is secured on an output shaft 52 coaxial with the input shaft 30 and journaled in a bearing 54 mounted in the housing 10. Retaining rings 56, 58 (FIG. 1) serve to maintain the output shaft and its circular spline 50 in axial operating position.

For purposes of comparison a description of the operation of the transmission of FIGS. 1–3 will be deferred until the construction of the transmissions of FIGS. 4–7 and 8–9 is next explained.

Referring now to FIG. 4, only so much of this transmission will be described as is necessary to differentiate it from that shown in FIGS. 1–3, like parts bearing like reference characters. The external flexspline teeth 26 are separated from internal flexspline teeth 28 by an axial distance suitable to accommodate the wave generator 40 and its bearing elements 42, 44, 46. It will accordingly be clear that the wave generator and its bearing act as a fulcrum on the flexspline in the course of progressing a circumferential wave of radial deflection therein. FIG. 5, except for showing the wave generator and its bearing, largely corresponds to FIG. 2, and FIG. 7 largely corresponds to FIG. 3. FIG. 6 illustrates the fact that, in the FIG. 4 type of transmission, no meshing engagements of flexspline or circular spline teeth occur radially and directly opposite to the wave generator bearing.

In the FIG. 8 arrangement next to be differentiated, the input shaft 30 is elongated and carries at its right hand end, not a rigid circular spline, but a cup-shaped, radially deflectible, tubular spline 60 (FIGS. 8 and 9) which is disposed coaxially within the flexspline 16. The annular type wave generator 40, together with its bearing, is disposed to impart an elliptoidal shape to the flexspline 16, but only by first directly imposing its lobar shape on the open or deflectible end of the flexspline 60. The latter accordingly has spline teeth 62 externally formed for spaced engagements and circumferential meshings with internal teeth 64 formed on the flexspline 16. In FIG. 9 the meshing localities of the teeth 62, 64 are shown occurring at a vertical major axis, and their non-meshing or clearing localities are shown occurring at the horizontal minor axis. FIG. 9 also shows that the wave of radial displacement imposed on the inner, rotatably driving flexspline 60 is of sufficient amplitude at the major axis to cause external spline teeth 66 on the flexspline 16 to engage and fully mesh the diametrically opposed localities with internal spline teeth formed on the rigid circular output spline 50.

To facilitate construction of the outer flexspline having radially disposed inner and outer teeth 64, 66 respectively, its cylindrical portion may have an inside cylindrical sleeve 68 (FIG. 8) separately fabricated but in effect integrally secured to the outer flexspline and sealed by the cap 22. The wave generator being elliptoidal, the teeth on the inner flexspline 60 will be less in number than those formed internally of the outer flexspline by two or a multiple thereof, and the external teeth on the outer flexspline will be less in number than those internally formed on the circular flexspline 50 by two or a multiple thereof.

Operation of the three described embodiments of the invention, though basically the same in maintaining integrity of the sealed barrier and attaining greater torque capability over prior harmonic drives for a given size of assembly, differs in certain usually minor ways. Considering first the arrangement of FIGS. 1–3, the rotatably driven input circular spline 32 engages with internal flexspline teeth 28 (at the horizontal major axis as seen in FIG. 3). Since the flexspline 16 is held against rotation about its axis of symmetry, the elliptoidal shape imposed by the "free wheeling" or relatively unrestrained wave generator 40 is caused to rotate in the flexspline 16 at an increased speed dependent upon the ratio of the numbers of teeth in the sets 32 and 28. This "first stage" speed increasing relation is usually stepped down again by the same ratio to provide an output speed substantially equal to that of the input speed. Thus, if there were two fewer teeth 32 than teeth 28, the circular spline teeth 48 would be two more than the teeth 26, and the teeth 26, 28 would be equal in number thereby providing output rotation beyond one side of the sealing barrier of the same speed as the input on the other side of the barrier. Specifically, depending on actual numbers of teeth employed, a transmission of the invention might combine a 50:1 speed increaser arrangement acting on a 1:50 reducer to provide an input to output ratio of 1:1. These ratios would obtain, for example, in a case where the teeth 32 were 100 in number, and the internal flexspline teeth 28 were 102 in number $$\left(\frac{100}{102-100}=\frac{50}{1}\right)$$

and the output circular spline teeth 48 were 100 in number while the external teeth of the flexspline were 98 in number $$\left(\frac{100-98}{100}=\frac{1}{50}\right)$$

output is then in the opposite direction as input.

A design limitation is recognized in that it is undesirable to operate the wave generator bearing at excessive speed. It will be apparent, however, that the arrangement is advantageous in that it is compact, that one tubular member can provide two flexspline functions and that positive driving through a sealed barrier is accomplished with high efficiency. Use of the wave generator 40 in the manner described has an advantage too in that by outwardly deflecting the flexspline along the major axis in the plane II—II, the internal flexspline teeth 28 are urged inwardly on the major axis at right angles to the line III—III thereby effecting better mating engagements with the circular spline teeth 32.

In the arrangement of FIGS. 4–7, the fulcruming action on the flexspline of the wave generator 40 as mentioned in connection with the FIG. 1 arrangement is accentuated by reason of the intermediate axial location of the wave generator. Thus spline ratcheting tendency on both the inside and outside of the flexspline is minimized. The slightly longer assembly is capable of higher torque transmission for a given diameter.

In the arrangement shown in FIG. 8 all localities of tooth engagement and meshing occur at the major axis. The internal flexspline 60 is rotated while the internal teeth 64 of the external flexspline 16 are held against rotation. Accordingly, in what might considered the first stage of this transmission wherein output is delivered to the wave generator 40, if the teeth 64 are 102 in number, and the teeth 62 are 100 in number, the wave generator 40 is rotated faster at a ratio of $$\frac{100}{102-100} \text{ or } \frac{50}{1}$$

i.e. in a direction opposite to that of the input shaft. In the "second stage," wherein the internal flexspline teeth 64 are performing as an input wave generator, if the circular spline output teeth 50 are 100 in number, and the teeth 66 are 98 in number, a reducer drive ratio of $$\frac{100-98}{100} \text{ or } +\frac{1}{50}$$

is obtained, and hence an over-all output of 1:1 is derived, the shaft 30 rotating in opposite direction to that of the shaft 52.

Having thus described my invention, what I claim as new and desire to secure by Letters Patent of the United States is:

1. In mechanism for transmitting rotary motion through a wall, a tubular, radially deflectible member having an end portion hermetically mounted on the wall and secured against rotation, sets of axial spline teeth formed one internally and one externally on the member, respectively, input and output circular splines coaxial with the member and respectively meshing with one set of the spline teeth formed thereon, at circumferentially spaced localities, and wave generator means coaxial with the member and disposed axially adjacent to the circular splines to impose a rotary lobar shape on the member thereby to determine their localities of splined engagements.

2. Mechanism as set forth in claim 1 wherein the wave generator means consists of a wave generator cam and a wave generator bearing interposed between the tubular member and the cam.

3. Mechanism as set forth in claim 1 wherein the number of teeth on the input spline and on the output spline are equal to provide a 1:1 transmission.

4. Mechanism as set forth in claim 1 and further characterized in that the wave generator means is axially intermediate the sets of spline teeth formed on the member.

5. Mechanism as set forth in claim 2 and further characterized in that the wave generator cam is ellipsoidal.

6. Mechanism as set forth in claim 1 wherein the sets of spline teeth formed on the member are radially opposite one another, and the input spline is formed on a radial deflectible tubular element and disposed to mesh with the internal set of spline teeth formed on the rotationally fixed, hermetically sealed member at spaced localities determined by the wave generator means.

7. Mechanism as set forth in claim 6 and further characterized in that wave generator means includes an ellipsoidal cam.

8. A transmission comprising a housing having an input end and an output end, input and output shafts respectively journaled for coaxial rotation in the housing ends, a tubular flexspline extending in coaxial relation to the shafts and having an open end mounted in hermetic sealing relation to the housing, a rigid circular spline secured to each of the shafts, each of the circular splines having spline engagements at spaced circumferential localities with the flexspline and at radially opposite sides thereof, and an ellipsoidal wave generator also mounted in coaxial relation to the shafts for radially deflecting and imposing a corresponding shape in the flexspline whereby the spline engagements are progressively circumferentially maintained when the input shaft is rotated.

9. A transmission as set forth in claim 8 and further characterized in that the sets of spline teeth of the circular splines are equal in number to provide a 1:1 transmission.

References Cited by the Examiner

"Harmonic Drive Illustrated Applications," Part II, Harmonic Drive Information Program. Published by United Shoe Machinery Corp. of Boston, Massachusetts. Copyright 1959. Note Figs. J and M.

DON A. WHITE, *Primary Examiner.*